United States Patent [19]

Drzewiecki

[11] 4,191,052

[45] Mar. 4, 1980

[54] NON-CONTACT FLUERIC TEMPERATURE SENSING METHOD AND APPARATUS

[75] Inventor: Tadeusz M. Drzewiecki, Silver Spring, Md.

[73] Assignee: The United States of America as represented by the Secretary of the Army, Washington, D.C.

[21] Appl. No.: 963,720

[22] Filed: Nov. 27, 1978

[51] Int. Cl.² ........................................... G01K 11/00
[52] U.S. Cl. ........................................... 73/357
[58] Field of Search ................................. 73/357

[56] References Cited

U.S. PATENT DOCUMENTS

| | | | |
|---|---|---|---|
| 2,455,285 | 11/1948 | Versaw | 73/37.5 |
| 2,598,178 | 5/1952 | Kalle | 73/357 |
| 3,077,767 | 2/1963 | Olliver | 73/37.5 |

*Primary Examiner*—S. Clement Swisher
*Attorney, Agent, or Firm*—Nathan Edelberg; Robert P. Gibson; Saul Elbaum

[57] ABSTRACT

A flueric nozzle-baffle combination for remotely measuring the surface temperature of either a stationary or moving object. The flueric nozzle opens to a sensing head which is preferably parallel to and opposed from the baffle surface of the object whose temperature is being measured. The back pressure of the fluid flowing through the nozzle is a function of the resistance to flow between the sensing head and the baffle which, in turn, is a function of temperature. If the distance between the sensing head and the baffle surface can be maintained constant, or can be measured by an auxiliary proximity sensor, the temperature may be computed as a linear function of sensed back pressure.

19 Claims, 5 Drawing Figures

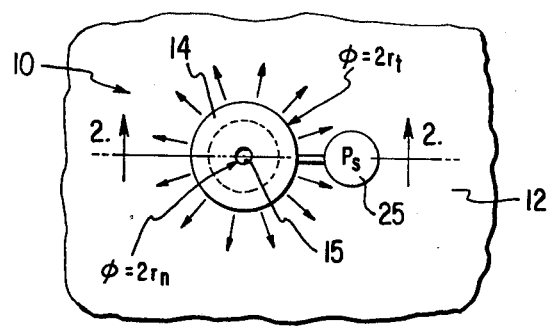
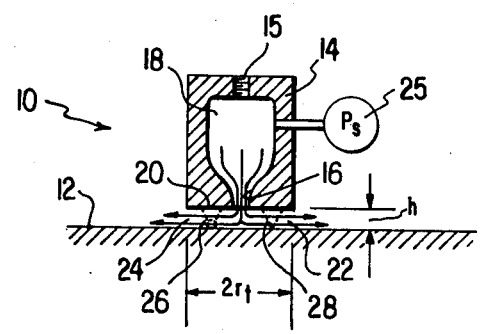
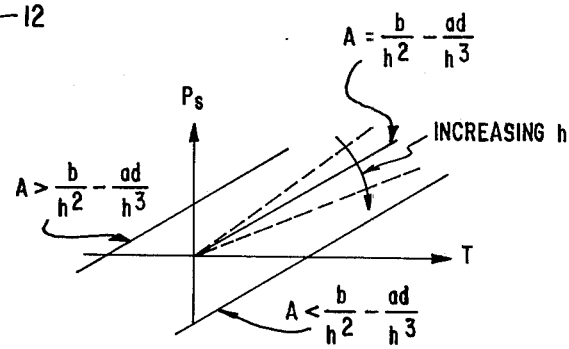
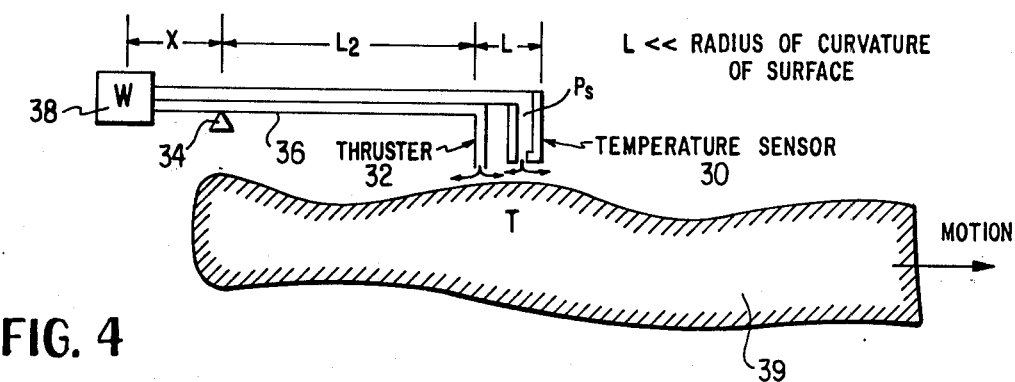
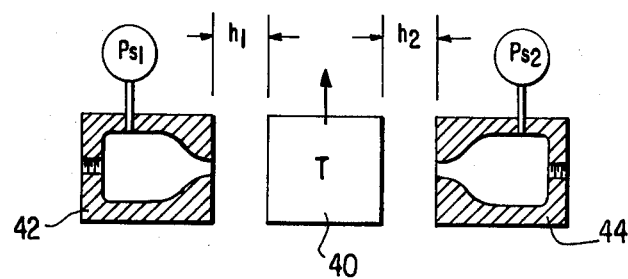

NON-CONTACT FLUERIC TEMPERATURE SENSING METHOD AND APPARATUS

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

The present invention is related to temperature sensing techniques and devices and, more particularly, is directed towards a method and apparatus for fluidically sensing the surface temperature of an object without contacting same.

2. Description of the Prior Art

In the present age of dwindling material energy resources, special emphasis has been placed by our national leaders on conservation—conservation of raw materials and reduction of energy usage per given process. It is therefore important to determine those processes that use or require the most energy. It is also critical to provide for the optimum use of the energy available.

To this end, it is interesting to note that studies conducted by the government and industry have indicated that in high-temperature processes where vast quantities of fuels, and hence energy, are used, the normal mode of operation is one of overcompensation. Products are overheated to ensure that they are at least at the minimum working temperature because no reliable temperature sensors, or no sensors at all, are available to establish the correct temperature. Precise knowledge of the process temperature at all stages would increase speed of working because less reheating and less handling would be necessary. Less reheating or, more precisely, less time at temperature would result in major energy savings. Current estimates indicate that simply monitoring temperature at critical process points may reduce total energy consumption by about 10 percent. If automatic temperature control can be incorporated into high-temperature processes it would obviously further reduce energy consumption and have the added benefit of a simplified and shorter production cycle.

Considerable effort has been expended on devising sensing techniques appropriate for military/industrial processes. The result in the current off-the-shelf state of the art is the development of various electronic and electro-optical transducers. Thermocouples and resistance thermometers are the old standbys; optical or infrared (IR) sensors are the new devices available. Disadvantages of these devices are that thermocouples alloy, diffuse, oxidize, or melt; resistance thermometers oxidize or melt. Both must be protected and thus often suffer from inadequate transient response. Optical sensors require clear optical paths, a good knowledge of the material emissivity, and heavy protection if the transducer itself is located near the process. Optical spectroscopy becomes unmanageable because of time restraints, actual physical bulk, and cost. At very high temperatures, above 1200° C. (2200° F.), only optical techniques have shown acceptably reliable operation, despite their limitations.

In the past 17 years, fluidic technology has addressed temperature measurement. A fluidic edgetone oscillator as described in U.S. Pat. No. 3,706,227 to Gottron et al was built out of graphite and operated at over 4000° F. (2200° C.). Not much was done with this device because of an oxidation problem. More recently, the Garrett-AiResearch Corportion has installed a fluidic sonic-oscillator temperature sensor in its automotive gas turbines. This sensor has proven continuous operation up to 1050° C. (1900° F.). It is constructed of high temperature steel. ERDA has recently become interested in monitoring the extremely high temperatures in foundry and other high energy consuming processes such as glass manufacture, so in conjunction with U.S. Army efforts relating to high-temperature monitoring in its own processes (rocket exhausts, tank and gun barrel forging, and gas turbine control), an effort in fluidic high-temperature sensing was initiated. Fluidics was chosen because it appeared to be the only technology that has only one limitation; that is, the temperature to be measured must be less than the melting temperature of the sensor. In addition, the simplicity of a fluidic sensor/preamplifier results in very low initial costs, and extremely long operating life.

The present invention is an outgrowth of the above-described research effort.

OBJECTS AND SUMMARY OF THE INVENTION

It is therefore a primary object of the present invention to provide a flueric temperature sensing method and apparatus which overcomes all of the disadvantages noted above with respect to prior art devices and techniques.

Another object of the present invention is to provide a flueric temperature sensing method and apparatus which does not require physical contact with the object whose temperature is being measured.

A further object of the present invention is to provide a non-contact flueric temperature sensing method and apparatus which does not require moving parts.

An additional object of the present invention is to provide a non-contact flueric temperature sensor which may be extremely inexpensively produced.

A still further object of the present invention is to provide a method and apparatus for sensing the temperature of an object wherein the temperature that can be sensed is limited only by the material of which the sensor is made.

An additional object of the present invention is to provide a temperature sensor which does not rely on heat transfer through the sensor material to thereby provide a fast response time.

An additional object of the present invention is to provide a non-contact flueric sensing apparatus whose output is essentially independent of the emmissivity or the translucence of the sensed object to thereby permit the temperature of transparent or multi-colored objects to be measured.

Another object of the present invention is to provide a method and apparatus for fluerically sensing the temperature of an object wherein the sensed objects may be very thin and delicate, or even liquid.

The foregoing and other objects are achieved in accordance with one aspect of the present invention through the provision of apparatus which comprises means for sensing the temperature of an object without requiring physical contact therewith. The means comprises means for directing a flow of fluid towards a surface of the object, and means for sensing the back pressure of the fluid flow directing means. The last-named means more particularly comprises a body having a plenum, a sensing head and an axisymmetric nozzle for communicating fluid from the plenum to the head. Means are also provided for establishing a substantially constant fluid flow rate through the nozzle, and the sensing head is preferably substantially planar and parallel to the surface of the object towards which the fluid flow is directed.

In accordance with other aspects of the present invention, means may also be provided for maintaining the distance between the sensing head and the surface substantially constant. In one embodiment, the distance maintaining means comprises means for extending between and continuously contacting both the sensing head and the surface, which may take the form of roller means connected to the sensing head for permitting the surface to move therealong, or fixed projection means extending from the sensing head to contact the surface. In another embodiment, the distance maintaining means comprises thruster means coupled to the head but not contacting the surface for directing an auxiliary fluid flow towards the surface. The sensing head and the thruster means may be commonly coupled on one end of lever means adapted to pivot about a fulcrum for maintaining the distance substantially constant.

In accordance with another aspect of the present invention, the width of the object whose temperature is being measured is fixed, and there is further provided second means for directing a second flow of fluid towards a second surface of the object along with second means for sensing the back pressure of the second fluid flow directing means. The positions of the first and second fluid flow directing means are fixed with respect to the object.

In accordance with yet another aspect of the present invention, means may be further provided for measuring the distance between the sensing head and the surface. The distance measuring means is relatively insensitive to the temperature on the surface, and may typically comprise an auxiliary fluidic jet proximity sensor.

In accordance with another aspect of the present invention, there is provided a method of sensing the temperature of an object without requiring physical contact therewith, comprising the steps of directing a flow of fluid through a nozzle and sensing head towards a surface of the object, establishing the distance between the sensing head and this surface, and sensing the back pressure developed by the fluid. The directing step includes the step of establishing a substantially constant rate of flow for the fluid through the nozzle, whereas the establishing step may comprise the step of maintaining the distance substantially constant. In one form, the constant distance maintaining step includes the steps of directing an auxiliary fluid flow towards the surface, and coupling means for providing the auxiliary fluid flow with the sensing head to pivot with a lever arm. Alternatively to maintaining the distance constant, the distance between the sensing head and the surface may be measured with a temperature insensitive device.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a top view which schematically illustrates one preferred embodiment of the present invention;

FIG. 2 is a vertical cross sectional view of the preferred embodiment illustrated in FIG. 1 and taken along line 2—2 thereof;

FIG. 3 is a graph of the characteristics of the preferred embodiment illustrated in FIGS. 1 and 2;

FIG. 4 is a schematic representation of an alternate embodiment of the temperature sensor of the present invention; and FIG. 5 is a schematic illustration of yet another alternate embodiment of the present invention.

DETAILED DESCRIPTION OF THE PREFERRED EMBODIMENTS

Referring now to the drawings, wherein like reference numerals represent identical or corresponding parts throughout the several views, and more particularly to FIGS. 1 and 2 thereof, a preferred embodiment of a flueric non-contact temperature sensor of the present invention is indicated generally by reference numeral 10.

The temperature sensor 10 of the present invention basically relies upon sensing the back pressure developed by a fluid flowing through a nozzle-baffle combination. Reference numeral 12 indicates the surface of an object whose temperature is being sensed. Spaced from surface 12 is a sensor body 14 having an axisymmetric nozzle 16 which is fed by a source of fluid (not shown) at a constant flow rate supplied through port 15 to plenum 18. Nozzle 16 opens onto the end wall or sensing head 20 of the sensor body 14 which is positioned a distance h above the surface 12.

The nozzle 16 and the surface 12 act as a nozzle-baffle combination and define a radial flow conduit 22 which yields a radial fluid flow path which is indicated by the arrows in FIGS. 1 and 2. Reference numeral 24 indicates generally the air curtain formed about the periphery of body 14 between sensing head 20 and surface 12, while reference numeral 25 indicates a pressure gauge or similar indicating instrument for sensing the back pressure $P_s$ in the plenum 18.

For the nozzle-baffle device set forth above, the resistance is inversely proportional to $h^3$ and directly proportional to the fluid viscosity which, in turn, is some known function of temperature. For air, viscosity is linear over certain ranges to within several percent. For a constant flow rate through the axisymmetric nozzle 16, the plenum 18 (back) pressure, $P_s$, will change with either temperature or proximity of the sensed surface 12. If the sensor proximity h is known, then the back pressure $P_s$ is related to the temperature of the sensed surface 12.

Mathematical Analysis

Assume that the sensed surface 12 is flat and parallel to the sensing head 20. This is true if the radius of curvature of any irregularity in surface 12 is very large compared with the diameter $2r_t$ of the head 20, and if the motion (if any) of the object 12 is parallel to the head 20.

Kirshner and Katz in *Design Theory of Fluidic Components*, Academic Press, N.Y. (1976), pp. 24–26, give a relationship for the resistance of a nozzle-baffle combination as:

$$\Delta P/\rho_o U^2 = 2.76 r_t/hN_{Rh} - 1.53 \qquad (1)$$

where:

$r_t/r_n=10$ and $r=r_n$

U=average velocity at the curtain 24 (average radial velocity at $r=r_n$)>>than velocity of moving object sensed.

$\rho$=fluid density; $\rho_o$=fluid density at nozzle exit=-constant $\Delta P$=differential pressure between the nozzle exit ($r=r_n$) and the baffle edge=$P_e - P_\infty$ where $P_\infty$=0 gage
$r_t$=radius of nozzle head
$N_{Rh} \equiv Uh/\nu$=Reynolds number
h=distance between head and sensed surface
$\mu$=dynamic viscosity of expelled fluid=$\mu(T)$
$\nu$=kinematic viscosity of expelled fluid$\equiv \mu/\rho$
T=temperature By the use of constant flow, which can be simply provided by either a conventional flow regulator or approximately by a constant pressure source through a resistance much higher than the baffle resistance, the average velocity U may be computed as the ratio of the flow to the curtain area out of the nozzle exit.

$$U = Q/(2\pi r_n h) \tag{2}$$

When equation (2) is combined with the definition of $N_{Rh}$ in equation (1), the solution for the pressure at the nozzle yields:

$$P_e = \frac{13.8 \rho_o Q}{\pi h^3} \nu - \frac{0.38 Q^2 \rho_o}{\pi^2 r_n^2 h^2}. \tag{3}$$

For the sake of simplicity, let us define the combined constant terms as single constants:

$$a \equiv 13.8 Q \rho_o / \pi \tag{4}$$

$$b \equiv (0.38 Q^2/\pi^2 r_n^2) \rho_o. \tag{5}$$

Now equation (3) becomes
$$P_e = a(\nu/h^3) - b/h^2 \tag{6}$$

The pressure $P_s$ in the plenum 18 of the nozzle 16 (the back pressure) is of primary interest, since this will be the output signal of the sensor 10 which can be interfaced to other fluidic, electronic or mechanical pressure transducers. The relation for this pressure $P_s$ can be obtained from the flow relation through the known nozzle geometry:

$$Q = c_d \pi r_n^2 (2(P_s - P_e)/\rho_o)^{\frac{1}{2}} \tag{7}$$

Thus, the following unique relation exists between the back pressure $P_s$ and the nozzle exit pressure $P_e$:

$$P_s = \left[ \frac{Q}{c_d \pi r_n^2} \right]^2 \frac{\rho_o}{2} + P_e. \tag{8}$$

When equation (6) is substituted for $P_e$ in equation (8), then $$P_s = \frac{\rho_o}{2} \left[ \frac{Q}{c_d \pi r_n^2} \right]^2 + a \frac{\nu}{h^3} - \frac{b}{h^2}. \tag{9}$$

Utilizing equation (5), equation (9) simplifies to:

$$P_s = b \left( \frac{1.47}{c_d^2 r_n^2} - \frac{1}{h^2} \right) + a \frac{\nu}{h^3}. \tag{10}$$

If the fluid used is a gas, say air, a straight line approximation may be made to the relationship between the kinematic viscosity and T, for example:

$$\nu = gT + d \tag{11}$$

where for 1000° C.<T<2000° C.:
$g = 2 \times 10^{-7}$ m²/s/°C.
$d = -0.187 \times 10^{-4}$ m²/s.

Equation (10) thus becomes $$P_2 = b \left( \frac{1.47}{c_d^2 r_n^2} - \frac{1}{h^2} \right) + ag \frac{T}{h^3} + \frac{ad}{h^3}. \tag{12}$$

Again combining constant terms so that $$A \equiv \frac{1.47 b}{c_d^2 r_n^2}; B \equiv ag,$$

the back pressure is then $$P_s = B \frac{T}{h^3} - \frac{b}{h^2} + A + \frac{ad}{h^3}. \tag{13}$$

If this relation is plotted, as in FIG. 3, the sensor output, $P_s$, is linear with temperature, and the sensitivity ($dP_s/dT$) decreases as the proximity, h, increases. It is implicit in this crude analysis that the fluid temperture is at the temperature of the sensed surface and hence the viscosity varies as the temperature of that surface. Obviously, heat transfer occurs, such as heating of the nozzle head, to make this assumption invalid. This will lead to a certain degree of inaccuracy in a given reading; however, it could be made small by appropriate design. The equation for the back pressure merely demonstrates that there is a functional relationship between it and the fluid temperature which is related to the surface temperature. It is thus important that the fluid temperature be as close to the surface temperature as possible to remove any non-linear, non-unique, heat-transfer effects. This can be done readily, for example, by increasing the nozzle head diameter so that the fluid is in contact for a longer time. Similarly, the flow rate may be reduced.

For the foregoing relationship, three general cases may now be considered. In the first case, h is fixed and known; in the second case, h is unknown, but an object of constant width passes between two sensors; and in the third case, h is unknown and must be measured with a temperature independent proximity sensor. Each of these cases will now be considered in greater detail below.

CASE 1

This is the simplest case. A fixed distance h can be maintained by any of a number of different contact or non-contact arrangements. One contact embodiment can, for example, utilize rollers 26 or a fixed offset ridge or ridges 28 as shown in dotted outline in FIG. 2. This would be advantageous for applications where an object 12 may be moved up to the head 20 to have its temperature measured, although low temperature (<600° C.) objects passing by could also be handled.

(High temperature objects sliding or rolling by may cause undue wear on the offset device.)

A non-contact embodiment is illustrated in FIG. 4 wherein the sensing head 30 rides on a cushion of air provided by an auxiliary thruster jet 32. The thruster jet 32, located sufficiently far away from the nozzle of temperature sensor 30, may be pivoted as at 34 on a hinged beam 36 for maintaining the assembly at a fixed distance from object 39. This embodiment would be particularly advantageous for measuring surface temperatures of moving irregular objects.

The thruster 32 will maintain a constant distance h provided that the flow through the thruster 32 is constant and much greater than any thrust generated by the temperature sensor 30. The force F developed by the thruster 32 is the sum of the thrust plus the static pressure acting on the end in the air cushion:

$$F = \underbrace{\rho_o A V^2}_{\text{thrust force}} + \underbrace{P_e A_e}_{\text{static pressure force}}. \quad (14)$$

The pressure at the exit is obtained from the Bernoulli equation for flow exiting an orifice whose area is the curtain area formed by the nozzle circumference and the height away from the object:

$$P_e = \frac{\rho_o Q_t^2}{2(2\pi r h)^2} = \frac{\rho_o Q_t^2}{8\pi^2 h^2 r^2}. \quad (15)$$

Substituting equation (15) into equation (14) and noting that $A = \pi r^2$ and that $Q_t = \pi r^2 V$ results in:

$$F = \rho_o \pi r^2 V^2 \left(1 + \frac{A_e}{8h^2 \pi}\right). \quad (16)$$

The sum of the moments about the pivot point 34 must be equal to zero if the bar 36 is to be in equilibrium. Let W = weight of counterweight 38
X = length of counterweight arm
$W_1$ = equivalent weight of sensor 30 and thruster 32
$L_1$ = equivalent lever arm of sensor 30 and thruster 32
$L_2$ = length of lever arm for thruster 32
$A_e$ = exit area of thruster 32.

Therefore:

$$\Sigma M = O = WX - W_1 L_1 + F L_2. \quad (17)$$

Substituting equation (16) into equation (17) results in:

$$O = WX - W_1 L_1 + \rho_o \pi r^2 V^2 \left(1 + \frac{A_e}{\pi 8 h^2}\right) L_2. \quad (18)$$

Since $Q_t = \pi r^2 V$, then $$WX - W_1 L_1 + \frac{\rho_o Q_t^2}{\pi r^2} \left(1 + \frac{A_e}{\pi 8 h^2}\right) L_2 = 0.$$

Since all geometric quantities are constant, as are all weights, and if Q=constant, then h=constant, whose value is:

$$h = \left[\frac{8\pi}{A_e}\left(\frac{W_1 L_1 - WX}{\rho_o L_2 Q_t^2} - 1\right)\right]^{-\frac{1}{2}}. \quad (19)$$

The distance h thus being fixed, the temperature sensor equation [equation (13)] results in a simple linear equation in T:

$$P_s = \frac{B}{h^3} T + \left(A - \frac{b}{h^2}\right) + \frac{ad}{h^3}$$

or if $C = \frac{B}{h^3}$ and $D = A - \frac{b}{h^2} + \frac{ad}{h^3}$, then $$P_s = CT + D. \quad (20)$$

The same equation (20) applies for any known value of h. The thruster embodiment described above of course has a moving part which under some circumstances may not be desirable.

CASE 2

As illustrated schematically in FIG. 5, if the width of the sensed object 40 is fixed so that the proximity of two sensors 42 and 44 to the object 40 have a fixed sum so that $h_1 + h_2$ = constant, then equation (13) may be written twice, once for each sensor 42 and 44, thereby resulting in three equations in three unknowns:

$$P_{s1} = \frac{BT}{h_1^3} - \frac{b}{h_1^2} + A + \frac{ad}{h_1^3} \quad (21)$$

$$P_{s2} = \frac{BT}{h_2^3} - \frac{b}{h_2^2} + A + \frac{ad}{h_2^3} \quad (22)$$

$$h_1 + h_2 = \text{constant} = H \quad (23)$$

with $h_1$, $h_2$ and T being unknown. The solution of equations (21), (22) and (23) requires the solution of a third order polynomial in $h_1$ and an implicit equation in T. This may be accomplished easily on a computer. Substituting equation (23) into (22) and solving equation (21) for $h_1$ in terms of T results in:

$$h_1^3 + \frac{bh_1}{P_{s1} - A} - \frac{BT + ad}{(P_{s1} - A)} = 0 \quad (24)$$

$$\text{where } h_1 = h_1(P_{s1}, T). \quad (25)$$

The solution for T of the combination of equations (22) and (23) results in $$T = \frac{(P_{s2} - A)(H - h_1)^3 + b(H - h_1) - ad}{B}. \quad (26)$$

Equation (26) is implicit in T since $h_1 = h_1(T)$; however:

$$T = T(P_{s1}, P_{s2}). \quad (27)$$

Therefore, by monitoring the back pressures $P_{s1}$ and $P_{s2}$ of sensors 42 and 44, the value of T may be computed.

CASE 3

When the proximity of the head to the sensed object is unknown, the proximity may be independently measured by a proximity sensor that is relatively insensitive to the temperature. This proximity sensor may be essentially of the same type as the thruster 32 of Case 1 described above, or alternatively may comprise a focussed jet proximity sensor for larger distances. The exit pressure $P_e$ of a jet from the proximity sensor having no baffle wall is given by equation (15) shown here as equation (28):

$$P_e = \rho_o Q_p^2 / 8\pi^2 r_p^2 h^2. \qquad (28)$$

For constant flow, $Q_p$, the back pressure $P_B$ is determined from the Bernoulli equation of flow through the proximity sensor nozzle:

$$P_B - P_e = \rho_o Q_p^2 / (2c_d^2 \pi^2 r_p^4). \qquad (29)$$

When equations (28) and (29) are combined, the result is:

$$P_B = \frac{\rho_o Q^2}{2\pi^2 r_p^2} \left( \frac{1}{C_{dp}^2 r_p^2} + \frac{1}{4h^2} \right) \qquad (30)$$

where $r_p$ = radius of proximity sensor nozzle; and
$c_{dp}$ = discharge coefficient of proximity sensor nozzle.

When equation (30) is solved for h, the following results:

$$h = \left[ \frac{8\pi^2 P_B r_p^2}{\rho_o Q_p^2} - \frac{4}{c_{dp}^2 r_p^2} \right]^{-\frac{1}{2}}. \qquad (31)$$

Equation (31) combined with equation (13) results in:

$$T = \frac{\frac{(P_S - A)}{8(P_B/b - 1/c_d r^2)} + \frac{b}{2}}{B\sqrt{\frac{P_B}{b} - \frac{1}{c_d^2 r^2}}} - \frac{ad}{B} \qquad (32)$$

if $r_p = r_n = r$ and $Q_p = Q_s = Q$.

The temperature T may be computed by measuring $P_s$ and $P_B$. The computation of T from either equation (27) or equation (32) may be accomplished in any conventional manner, e.g., fluidically. Most certainly, the very small changes in the temperature sensor back pressures will be amplified fluidically so that wherever $P_s$ appears in an equation, it is replaced by $$P_s = \Delta P_o / G_p \qquad (33)$$

where $\Delta P_o$ is the fluidic differential output pressure from a gain block having a gain of $G_p$. The quantity $\Delta P_o$ can be easily measured by conventional devices that are far less costly and far more reliable than very high resolution sensors. Similar treatment can be afforded the back pressure of the proximity sensor, especially if the distances become large and the pressure changes are small.

The non-contact temperature sensor of the present invention may therefore be seen to provide the following advantages and improvements over the sensors of the prior art:

1. There is no physical solid-solid contact between the sensor of the present invention and the sensed object, and thus there are no parts to wear out.

2. The moving parts of the sensor can be limited to none in most cases, and to one in the case of the contour following head (described in CASE 1).

3. The sensor of the present invention can be fabricated at great cost savings and effectiveness since only simple axisymmetric holes need be drilled.

4. The temperature that can be sensed with the present invention is limited only by the material of which the sensor is made. Construction with high temperature ceramics may allow temperatures up to or exceeding 5000° F. to be sensed.

5. The sensor of this invention does not implicitly rely on the thermal conductivity of the sensor material. Hence, the response time is fast and limited only by the thermal heating of the fluid emanating from the sensor.

6. The sensed objects may be transparent. This is a great advantage over the radiation (optical) sensors of the prior art.

7. The sensed objects may be very thin or delicate, or even liquid. The flowrate in the sensor must be adjusted accordingly, however, to prevent cooling or distortion by the sensor flow.

8. Pressure signals may be transmitted considerable distances so that computation may proceed at normal temperatures.

Obviously, numerous modifications and variations of the present invention are possible in light of the above teachings. I therefore wish it to be understood that within the scope of the appended claims the invention may be practiced otherwise than as specifically described herein.

I claim as my invention:

1. Apparatus, which comprises:
   means for sensing the temperature of an object without requiring physical contact therewith, said means comprising:
   means for directing a flow of fluid toward a surface of said object, said fluid flow directing means comprising a body having a plenum, a sensing head and an axisymmetric nozzle opening onto said head for communicating fluid from said plenum to said head, the radius of said head being at least ten times the radius of said nozzle; and
   means for sensing the back pressure of said fluid flow directing means.

2. The temperature sensing apparatus as set forth in claim 1, further comprising means for establishing a substantially constant fluid flow rate through said nozzle.

3. The temperature sensing apparatus as set forth in claim 2, wherein said sensing head is substantially planar and parallel to said surface of said object towards which said fluid flow is directed.

4. The temperature sensing apparatus as set forth in claim 2, further comprising means for maintaining the distance between said sensing head and said surface substantially constant.

5. The temperature sensing apparatus as set forth in claim 4, wherein said distance maintaining means comprises means for extending between and continuously contacting both said sensing head and said surface.

6. The temperature sensing apparatus as set forth in claim 5, wherein said contacting means comprises roller means connected to said sensing head for permitting said surface to move therealong.

7. The temperature sensing apparatus as set forth in claim 5, wherein said contacting means comprises fixed projection means extending from said sensing head to contact said surface.

8. The temperature sensing apparatus as set forth in claim 4, wherein said distance maintaining means comprises thruster means coupled to said head but not contacting said surface for directing an auxiliary fluid flow towards said surface.

9. The temperature sensing apparatus as set forth in claim 8, wherein said sensing head and said thruster means are commonly coupled on one end of lever means adapted to pivot about a fulcrum for maintaining said distance substantially constant.

10. The temperature sensing apparatus as set forth in claim 2, wherein the width of said object is fixed, and further comprising second means for directing a second flow of fluid towards a second surface of said object, and second means for sensing the back pressure of said second fluid flow directing means.

11. The temperature sensing apparatus as set forth in claim 10, wherein the positions of said first and second fluid flow directing means are fixed with respect to said object.

12. The temperature sensing apparatus as set forth in claim 2, further comprising means for measuring the distance between said sensing head and said surface.

13. The temperature sensing apparatus as set forth in claim 12, wherein said distance measuring means is relatively insensitive to the temperature on said surface.

14. The temperature sensing apparatus as set forth in claim 13, wherein said distance measuring means comprises an auxiliary fluidic jet proximity sensor.

15. A method of sensing the temperature of an object without requiring physical contact therewith, comprising the steps of:
  directing a flow of fluid through a nozzle opening onto a sensing head toward a surface of said object so that said fluid assumes the temperature of said object;
  establishing the distance between said sensing head and said surface; and
  sensing the back pressure developed by said fluid.

16. The method as set forth in claim 15, wherein said directing step includes the step of establishing a substantially constant rate of flow for said fluid through said nozzle.

17. The method as set forth in claim 15, wherein said establishing step comprises the step of maintaining said distance substantially constant.

18. The method as set forth in claim 17, wherein said maintaining step includes the steps of directing an auxiliary fluid flow towards said surface, and coupling means for providing said auxiliary fluid flow with said sensing head to pivot with a lever arm.

19. The method as set forth in claim 15, wherein said establishing step includes the step of measuring the distance between said sensing head and said surface with a temperature insensitive device.

* * * * *